United States Patent
Tanaka

(10) Patent No.: US 8,279,160 B2
(45) Date of Patent: Oct. 2, 2012

(54) LED DRIVING ELEMENT, BACKLIGHT DEVICE, AND BACKLIGHT DEVICE DRIVING METHOD

(75) Inventor: Shinichi Tanaka, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 874 days.

(21) Appl. No.: 12/114,429

(22) Filed: May 2, 2008

(65) Prior Publication Data

US 2009/0213103 A1 Aug. 27, 2009

(30) Foreign Application Priority Data

May 2, 2007 (JP) .................................. 2007-121484

(51) Int. Cl.
G09G 3/36 (2006.01)
G09G 5/00 (2006.01)

(52) U.S. Cl. ........................ 345/102; 345/100; 345/204
(58) Field of Classification Search .................. 313/500; 345/102; 362/97.1

See application file for complete search history.

(56) References Cited

U.S. PATENT DOCUMENTS

| 7,675,488 B2* | 3/2010 | Chen ................................ 345/76 |
| 2005/0062685 A1* | 3/2005 | Nogawa .......................... 345/46 |
| 2005/0212722 A1* | 9/2005 | Schroeder ....................... 345/44 |
| 2007/0182677 A1* | 8/2007 | Lee et al. ......................... 345/82 |
| 2008/0231579 A1* | 9/2008 | Vasquez et al. ................. 345/98 |

* cited by examiner

*Primary Examiner* — Alexander S Beck
*Assistant Examiner* — Nguyen Truong
(74) *Attorney, Agent, or Firm* — William B. Kempler; Wade J. Brady, III; Frederick J. Telecky, Jr.

(57) ABSTRACT

An LED driving element that can perform black line insertion display without increasing the clock frequency. LED driving element 11 has first and second shift registers 34a, 34b used for controlling the light-emitting elements on one side among the light-emitting elements arranged in two adjacent rows. In the normal mode, the first and second shift registers 34a, 34b are connected in series. In the image quality improvement mode, the first or second shift register is bypassed by short circuit line 30. In the normal mode, the light emission data are moved serially through the first and second shift registers 34a, 34b. In the image quality improvement mode, the light emission data are moved in only one shift register, that is, shift register 34a or 34b, so that black line insertion can be performed in the same rewriting time per row as in the normal mode without increasing the clock frequency.

4 Claims, 4 Drawing Sheets

LED DRIVING ELEMENT, BACKLIGHT
DEVICE, AND BACKLIGHT DEVICE
DRIVING METHOD

FIELD OF THE INVENTION

The present invention pertains to the backlight device for a liquid crystal display device. In particular, the present invention pertains to an LED driving element in the backlight device.

Since LEDs have a long service life and low power consumption, they have attracted a lot of attention for backlighting liquid crystal display devices. In recent years, they have been used not only for the liquid crystal display device of cellular phones but also for the liquid crystal display device of TVs.

Symbols 121 in FIGS. 3(a), (c) represent light-emitting elements, which are arranged regularly at prescribed intervals in the back of a liquid crystal display device. Said light-emitting elements 121 output white light. However, it is also possible to use LEDs that output white light as light-emitting elements 121 by combining red (R) LEDs, green (G) LEDs, and blue (B) LEDs.

With regard to the light emission method when used for TV, there is a normal display mode and an image quality improvement mode. In the normal display mode, all of the light-emitting elements 121 are turned on. On the other hand, in the image quality improvement mode, one row of light-emitting elements 121 running in the horizontal direction of the screen is turned off, while another row is turned on to form a black line B. Said black line B is moved downwards (or upwards) as shown in FIGS. 3(a), (c). There is no need to turn off the light-emitting elements to form said black line. It is also possible to lower their brightness.

It is known that when black line B is moved to the top or bottom of the screen at a certain speed, the image quality of moving images can be improved.

In order to control the light emission of light-emitting elements 121, one LED driving element is used to control plural light-emitting elements 121. In order to reduce the wiring length between the LED driving element and each light-emitting element 121 as much as possible, the LED driving element is arranged between two adjacent rows of light-emitting elements 121.

In order to control the many light-emitting elements included in two rows, plural LED driving elements are arranged between the rows of the light-emitting elements. The LED driving elements are connected in series. Light emission data indicating the light emission status of the light-emitting elements move in the LED driving elements and are transmitted from the LED driving elements in the first position to those in the last position.

FIG. 4 shows the schematic relationship between LED driving element 130 and light-emitting element 121. In this example, one driving element 130 drives 8 light-emitting elements 121 in two adjacent rows. The light emission data (driving data) used for driving light-emitting elements 121 are supplied sequentially to driving element 130 in the order of arrow 101 shown in the figure.

Since the light emission data are supplied sequentially to driving element 130, in order to turn one of two adjacent rows into a black line and turn on the light-emitting elements in the other row, it is necessary to supply the light emission data for two rows each time that the row for the black line changes. As a result, when rewriting the light emission data used for black line display is performed at the same rewriting speed as usual, it is necessary to double the clock frequency. Therefore, high-frequency noise may occur.

BACKGROUND OF THE INVENTION

A general object of the present invention is to solve or reduce the problem of the aforementioned conventional technology by providing a LED driving element that can perform black line insertion display without increasing the clock frequency.

SUMMARY OF THE INVENTION

This and other objects and features are provided in accordance with one aspect of the present invention provides an LED driving element characterized by the following facts: it has plural first and second LED driving terminals connected to respective light-emitting elements comprising LED elements, first and second LED driving circuits which are connected to said first and second LED driving terminals, respectively, and which cause said light-emitting elements connected to said first and second LED driving terminals to emit light according to stored contents, a data input terminal into which light emission data indicating the light emission status of said light-emitting device are input sequentially, a data output terminal that outputs the light emission data output from said first or second shift register to the outside, and first and second shift registers that store said light emission data in the input order, store the same number of light emission data as there are first and second LED driving terminals, respectively, and output the overflow light emission data; when a transmission signal is input, said light emission data stored in said first and second shift registers are transmitted into said first and second LED driving circuits and are stored in said first and second LED driving circuits, respectively; the LED driving element has a switching circuit that switches between a normal mode in which said data input terminal, said first shift register, said second shift register, and said data output terminal, are connected in series, said light emission data input to said data input terminal are transmitted to said first shift register and said second shift register in that order and are output from said data output terminal, and an image quality improvement mode in which said first or second shift register is connected between said data input terminal and said data output terminal, said light emission data input to said data input terminal are transmitted into the shift register connected to said data input terminal and said data output terminal and are output from said data output terminal.

An aspect of the present invention also provides a backlight device characterized by the following facts: plural LED driving elements described in Claim 1 are connected in parallel with each other between plural said light-emitting elements; the data output terminal of one of adjacent LED driving elements is connected to the data input terminal of the other element; said light emission data input to the data input terminal of the former LED driving element are transmitted to the latter LED driving element.

An aspect of the present invention also provides an LED driving element characterized by the following facts: it is a rectangular LED driving element used for driving LED elements; it has a first driving terminal group arranged along the first edge, a second driving terminal group positioned along the second edge on the side opposite from said first edge, a first driving circuit connected to said first driving terminal group, a second driving circuit connected to said second driving terminal group, a first register that supplies plural driving data in parallel to said first driving circuit, a second register that supplies plural driving data in parallel to said second driving circuit, a data input terminal to which the plural driving data supplied are input in series, a data output terminal that outputs the plural driving data in series, and a switching circuit connected to said data input terminal, said first register, said second register, and said data output terminal; said switching circuit includes a first switch circuit used for connecting said data input terminal to the serial input terminal of said first register or a first data line, a second switch circuit used for connecting the serial output terminal of said first register to a second data line or a third data line, a third switch circuit used for connecting the serial input terminal of said second register to said second data line or first data line, and a fourth switch circuit used for connecting said data output terminal to the serial output terminal of said second register or said third data line; according to the connection states of said first and second, third, and fourth switch circuits, the driving data supplied to said data input terminal are transmitted serially on a first path including said data input terminal, said first register, said second register, and said data output terminal, a second path including said data input terminal, said first register, and said data output terminal, or a third path including said data input terminal, said second register, and said data output terminal.

An aspect of the present invention also provides a driving method for a backlight device having plural light-emitting elements arranged in a matrix form, a driving circuit used for driving the light-emitting elements of two adjacent rows, and a driving data supply circuit that supplies to said driving circuit the driving data used for driving the light-emitting elements in series. Said driving circuit includes a first driving part that drives the light-emitting elements in one of said two adjacent rows, a second driving part that drives the light-emitting elements in the other row of said two adjacent rows, a first shift register used for supplying said driving data to said first driving part, a second shift register used for supplying said driving data to said second driving part, a data input terminal to which said driving data are supplied, a data output terminal that outputs said driving data, and a switching circuit that switches the connections between said data input terminal, said first shift register, said second shift register, and said data output terminal. When the driving data for said first and second driving parts are updated, said switching circuit connects said first and second shift registers in series between said data input terminal and said data output terminal to supply the driving data sequentially to said first and second shift registers corresponding to a clock signal. When the driving data for said first or second driving part alone are updated, said switching circuit connects said first or second shift register between said data input terminal and said data output terminal to supply the driving data sequentially to said first or second shift register corresponding to a clock signal.

REFERENCE NUMERALS AND SYMBOLS AS SHOWN IN THE DRAWINGS

In the figures, 10 represents a backlight device, 11 represent an LED driving element, 21 represents a light-emitting element, 32a, 32b represent a first and second LED driving terminal, 33a, 33b represent a first and second LED driving circuit, 34a, 34b represent a first and second shift register, 36 represents a data input terminal, 37 represents a data output terminal.

DESCRIPTION OF THE EMBODIMENTS

Since black line insertion display for image quality improvement can be performed without increasing the clock frequency, the noise will not be increased. Also, since there is no need to increase the clock frequency, an increase of the power consumption of the driving elements can be limited.

Figure 2:
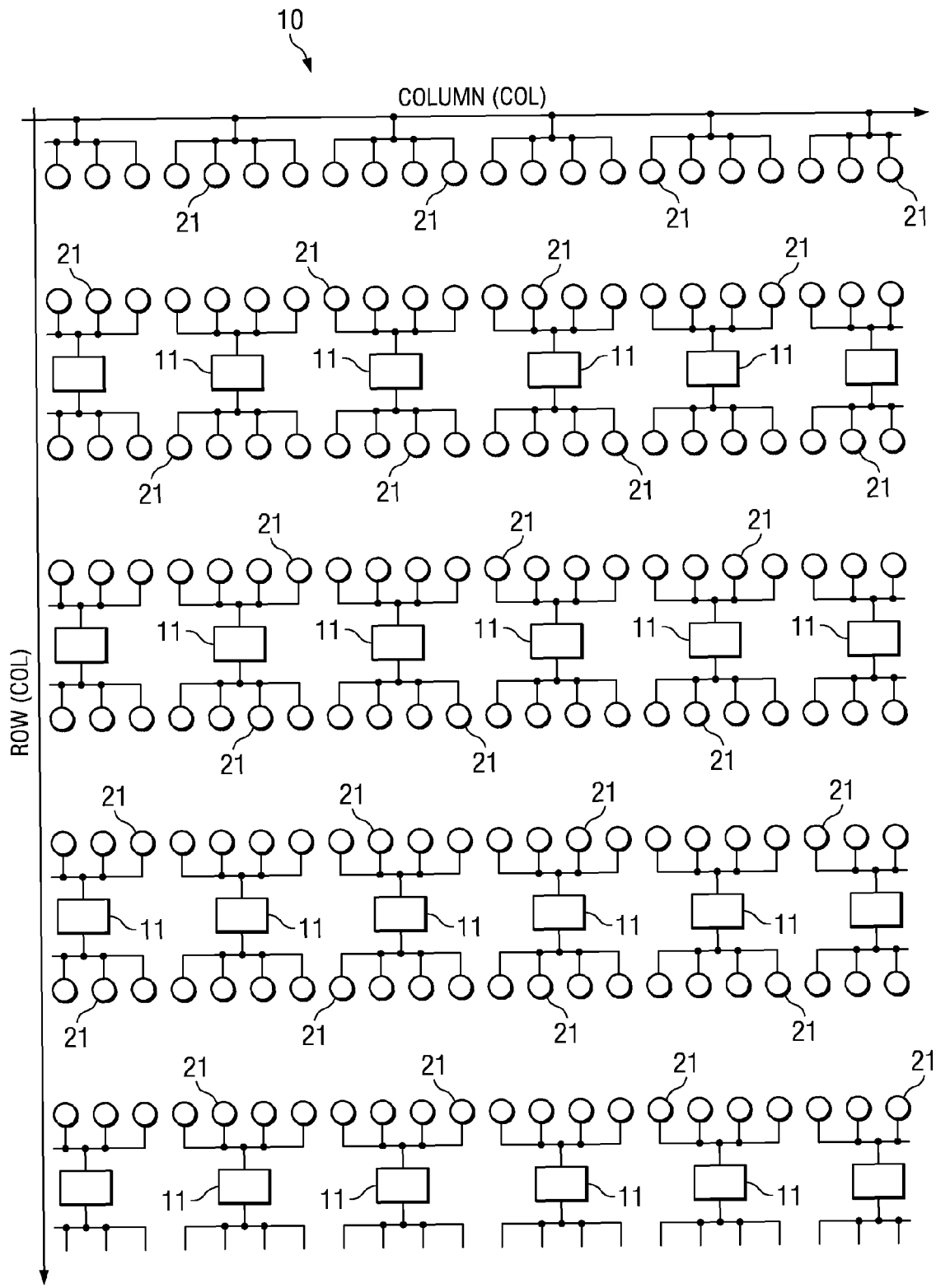
FIG. 2 is a diagram showing the positional relationship between the light-emitting element and the LED driving element.

Symbol 10 in FIG. 2 represents the backlight device of the present invention. Light-emitting elements 21 constituted with one or plural LED elements are arranged regularly on a substrate. The light output from each light-emitting element 21 illuminates the liquid crystal display device from the back so that the content displayed on the liquid crystal display device can be viewed. Said light-emitting element 21 outputs white light. However, it is also possible to use LEDs that output white light as light-emitting elements 21 by combining red (R) LEDs, green (G) LEDs, and blue (B) LEDs.

In this case, as shown in FIG. 2, light-emitting elements 21 are arranged on the substrate in a matrix form in the row direction (ROW), that is, the horizontal direction of the screen of the liquid crystal display device and in the column direction (COL), that is, the vertical direction of the screen.

Symbol 11 in FIG. 2 represents the LED driving element that drives light-emitting elements 21. It is arranged between two adjacent rows of light-emitting elements 21.

Figure 1:
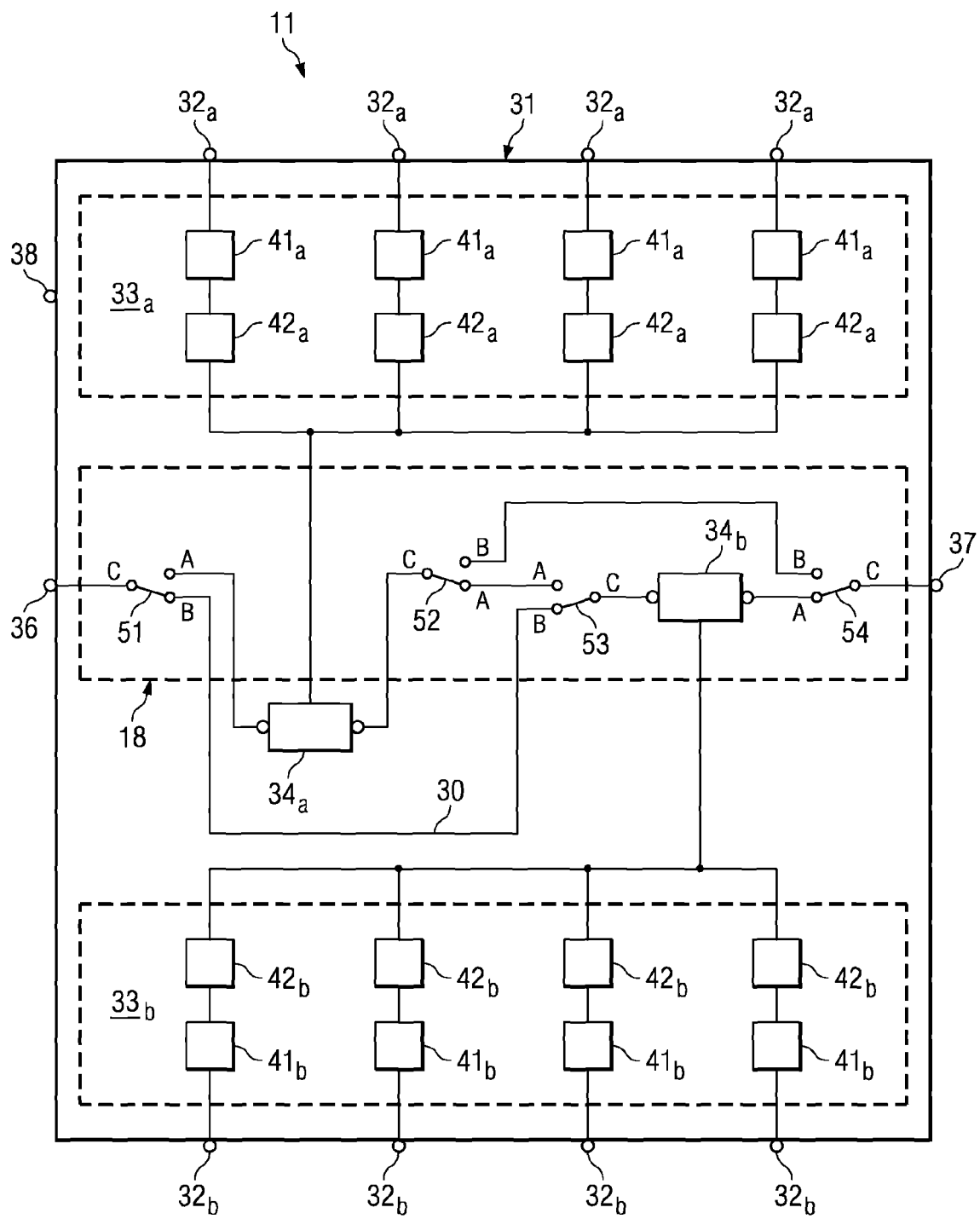
FIG. 1 shows an example of the LED driving element of the present invention.

FIG. 1 is an internal block diagram of LED driving element 11.

LED driving element 11 is an approximately square package 31, and LED driving terminals 32a, 32b are arranged in two rows along two edges.

Out of the two rows of LED driving terminals 32a, 32b, if the LED driving terminals 32a arranged in one of the rows are taken as the first terminals and the LED driving terminals 32b arranged in the other row are taken as the second terminals, LED driving element 11 is arranged such that the first and second LED driving terminals 32a, 32b are parallel with the two adjacent rows of light-emitting elements 21.

In order to reduce the wiring length as much as possible in the connections between LED driving element 11 and light-emitting elements 21, LED driving terminals 32a, 32b are connected to adjacent light-emitting elements 21. In this case, there are four LED driving terminals 32a or 32b in the first or second row so that a total of eight light-emitting elements 21 in two rows can be controlled.

The internal configuration of LED driving element 11 is explained below. LED driving element 11 has first and second LED driving circuits 33a, 33b and first and second shift registers 34a, 34b.

The first LED driving circuit 33a is connected to the first LED driving terminals 32a among the first and second LED driving terminals 32a, 32b. The second LED driving circuit 33b is connected to the LED driving terminals 32b in the second row.

First and second output circuits 41a, 41b and first and second latch circuits 42a, 42b are arranged in the first and second LED driving circuits 33a, 33b, respectively.

The number of first output circuits 41a and first latch circuits 42a is the same as the number of first LED driving terminals 32a. The number of second output circuits 41b and second latch circuits 42b is the same as the number of LED driving terminals 32b in the second row.

The first and second output circuits 41a, 41b are connected to the first and second LED driving terminals 32a, 32b, respectively. The first and second latch circuits 42a, 42b are connected to the first and second output circuits 41a, 41b, respectively.

A constant current circuit used for supplying a constant current to a light-emitting element 21 and a switching circuit that switches the connection of the light-emitting element 21 between the constant current circuit and ground potential are incorporated in the first and second output circuits 41a, 41b, respectively.

When the light-emitting elements 21 connected to output circuits 41a, 41b are connected to the constant current circuit, a constant current flows and the light-emitting elements are turned on. When connected to ground potential, the light-emitting elements are turned off. Each light-emitting element 21 is controlled by the switching operation of the switching circuit and is driven in a PWM dimming manner so that the quantity of light emitted is constant.

The switching circuit switches the connection at a certain period. If the period of being connected to the constant current circuit is the on period and the period of being connected to the ground potential is the off period, switching is performed so that the on period and off period alternate at a certain period. One period consisting of an on period and off period can have any frequency. For example, said one period can be synchronized with a horizontal synchronization signal or a vertical synchronization signal as the display control signal of the display device. In this case, the off period can be assigned to the horizontal blanking period or the vertical blanking period. It is also possible to divide the one period of the horizontal synchronization signal or the vertical synchronization signal into plural periods, and to synchronize one period of the on period and off period according to the divided periods.

The constant current circuit is constituted appropriately so that it can change the magnitude of the constant current flowing through light-emitting element 21. The switching circuit is constituted appropriately so that it can change the switching frequency and the ratio between the on period and off period.

The light emission data (driving data), which include the value of the constant current and the ratio between the on period and off period, and are used for determining the light emission state of light-emitting element 21, are stored in each of latch circuits 42a, 42b. Output circuits 41a, 41b operate according to the light emission data in the connected latch circuits 42a, 42b to make light-emitting elements 21 emit light. The light emission data also include the data used to control the brightness of the light-emitting element. The light emission data are supplied from a circuit not shown in the figure.

As will be described below, the light emission data are input from the first and second shift registers 34a, 34b into said latch circuits 42a, 42b.

The first and second shift registers 34a, 34b have a register input terminal to which the light emission data are input, a storage region used for storing the input light emission data, and a register output terminal that outputs the light emission data stored in the storage region.

The storage regions of the first and second shift registers 34a, 34b are appropriately constituted to store light emission data in the same number as the number of first and second LED driving terminals 32a, 32b. The storage regions correspond to the first and second latch circuits 42a, 42b in each section storing the light emission data, respectively.

Said LED driving element 11 has a trigger terminal (XLAT) 38. When a write signal is input to trigger terminal 38, the light emission data stored in the first and second shift registers 34a, 34b are output to the corresponding first and second latch circuits 42a, 42b and are respectively stored in the first and second latch circuits 42a, 42b.

The first and second output circuits 41a, 41b control the light emission of light-emitting elements 21 according to the light emission data of the latch circuits 42a, 42b connected to the output circuits 41a, 41b.

The sections storing the light emission data in the storage region are numbered. When one light emission data item is input from the register input terminal along with a clock signal, the light emission data stored in the storage region are shifted sequentially to the next section. The input light emission data is stored in the first position, and the light emission data stored in the last position is output to the outside from the register output terminal.

The LED driving terminals 32a, 32b connected to the light-emitting elements 21 close to the first position among the light-emitting elements 21 arranged side by side along each row correspond to the positions close to the front of the storage region. Consequently, when the light emission data are shifted from the first position to the last position in the storage regions in the first and second shift registers 34a, 34b, the position of light-emitting element 21 that emits light depending on the content of the light emission data is also shifted from the first position to the last position.

In the following, the procedure of input of the light emission data to the first and second shift registers 34a, 34b will be explained.

LED driving element 11 has data input terminal 36 to which the light emission data are input, data output terminal 37 that outputs the light emission data stored in LED driving element 11 to the outside, and switching circuit 18.

Switching circuit 18 changes the connection state of data input terminal 36, the first shift register 34a, the second shift register 34b, and data output terminal 37. It operates appropriately to set the internal circuitry to the normal mode or the image quality improvement mode.

In the normal mode, data input terminal 36, the first shift register 34a, the second shift register 34b, and data output terminal 37 are connected in series. When a light emission data item is input from data input terminal 36 into the first shift register 34a via data input terminal 36 and the first switch 51 in synchronization with a clock signal, the light emission data are moved from the first position to the last position in the storage region in the first shift register 34a. The overflow light emission data is input to the second shift register 34b via a second switch 52 and a third switch 53. The light emission data that have been input into the second shift register 34b are also moved from the first position to the last position in the storage region. The overflow light emission data is output from data output terminal 37 via a fourth switch 54. As described above, switching circuit 18 has first, second, third, and fourth switches 51, 52, 53, 54. In the normal mode, terminals C and A of the switches are connected to each other.

In the image quality improvement mode, only one shift register out of the first and second shift registers is connected between data input terminal 36 and data output terminal 37. The other shift register is cut off from data input terminal 36, data output terminal 37, and the clock signal.

When a light emission data item is input in synchronization with the clock signal to the shift register out of the first and second shift registers 34a, 34b that is connected between the data input terminal 36 and data output terminal 37, the light emission data are shifted from the first position to the last position in the storage region of that shift register. The overflow light emission data is output from data output terminal 37. The content stored in the other shift register is kept in the state existing before it was cut off from the clock signal.

When only the light emission data in the first shift register 34a are updated, the terminal C of the first switch 51 is connected to terminal A. The terminals C of the second and fourth switches 52, 54 are connected to terminal B. The first shift register 34a is connected between data input terminal 36 and data output terminal 37 via the first and second, and fourth switches 51, 52, 54. On the other hand, when only the light emission data in the second shift register 34b are updated, the terminals C of the first, third switches 51, 53 are connected to terminals B. The terminal C of the fourth switch 54 is connected to terminal A. The second shift register 34b is connected between data input terminal 36 and data output terminal 37 via the first, third, and fourth switches 51, 53, and 54.

For the LED driving elements 11 arranged parallel with each other between the rows of light-emitting elements 21, the data output terminal 37 of LED driving element 11 on the leading side is connected to the data input terminal 36 of the next adjacent LED driving element 11. If the number of LED driving elements 11 connected in series as described above is "m" and the number of the driving terminals in each of the first and second columns is "n", the number of clock pulses needed for the light emission data to pass from the first LED driving element 11 to the last LED driving element 11 is 2×m×n in the normal mode and is m×n in the image quality improvement mode.

In the image quality improvement method in which one black line is moved from the top to the bottom (or from the bottom to the top) of the screen, when all the light-emitting elements 21 in one row are turned off, the light-emitting elements 21 in the other rows are all turned on. Consequently, when the driving terminals in the first or second column of LED driving element 11 display the black line, that is, when light-emitting elements 21 are turned off, it is necessary to turn on the light-emitting elements 21 in the other column. As described above, when the black line is formed, it is also possible to lower the brightness of the light-emitting elements instead of turning them off.

In this case, in the normal mode, since both the light emission data indicating off and the light emission data indicating on must be input from the LED driving element 11 in the first position to the LED driving element 11 in the last position, if the duration of one clock pulse is t, it will take 2×m×n×t to turn off one row.

On the other hand, in the image improvement mode, when shift register 34a or 34b on the side of the row that is turned off is connected between data input terminal 36 and data output terminal 37 and shift register 34a or 34b on the side of the row that is turned on is cut off from data input terminal 36, data output terminal 37, and the clock signal, the light emission data input to data input terminal 36 are output to data output terminal 37 after passing through the first or second shift register 34a or 34b. Therefore, only a period of time m×n×t is needed.

In the normal mode, it takes a 2×m×n×t period of time to rewrite the contents stored in light-emitting elements 21 of two rows. That is, it takes m×n×t per row. Consequently, if the time for one clock pulse is halved, the light emission data of the black line cannot be written at the same speed as that in the normal mode. When the clock pulse time is halved, the frequency of the clock signal is doubled, and this can cause the generation of noise.

On the other hand, in the image quality improvement mode, since rewriting can be performed during time m×n×t, there is no need to halve the clock time in order to display the black line for image quality improvement. Therefore, noise will not be increased.

Figure 3A:
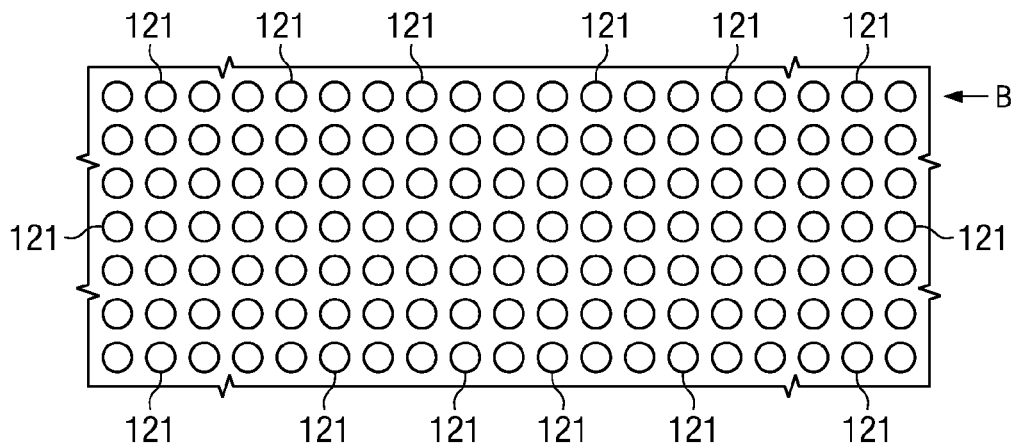
FIG. 3 is a diagram illustrating movement of the black line.
Figure 3B:
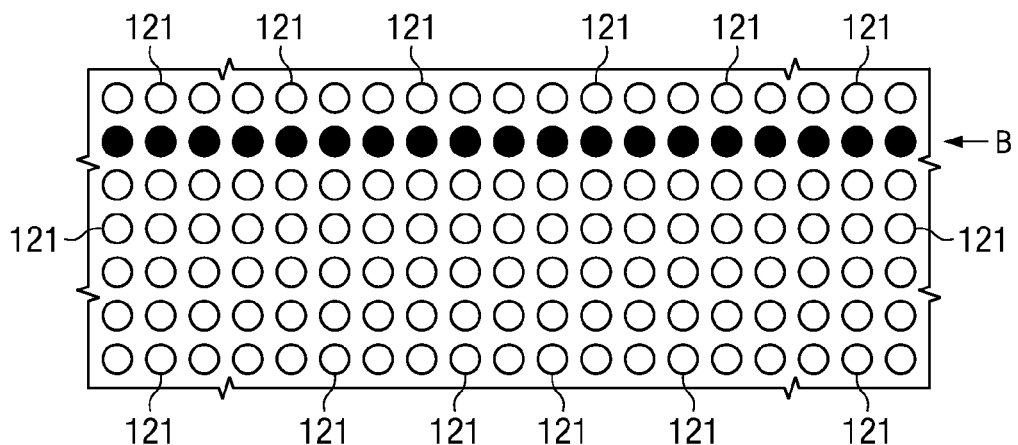
Figure 3C:
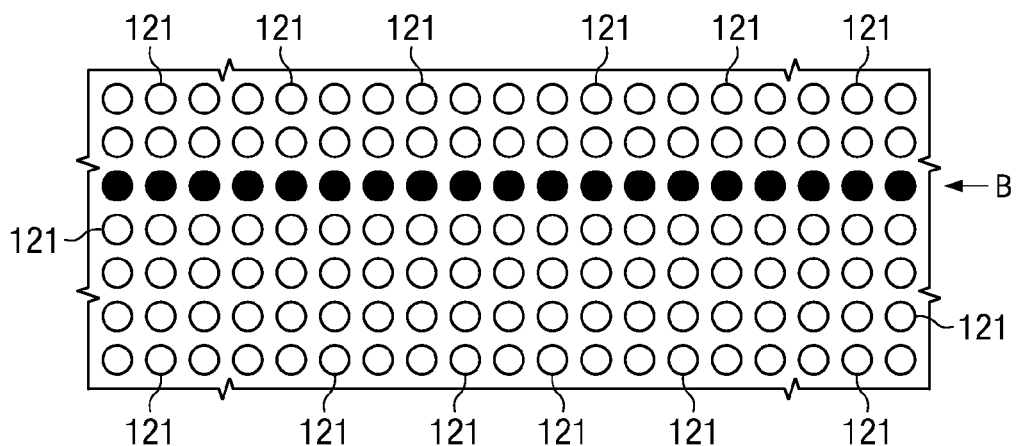
Figure 4:
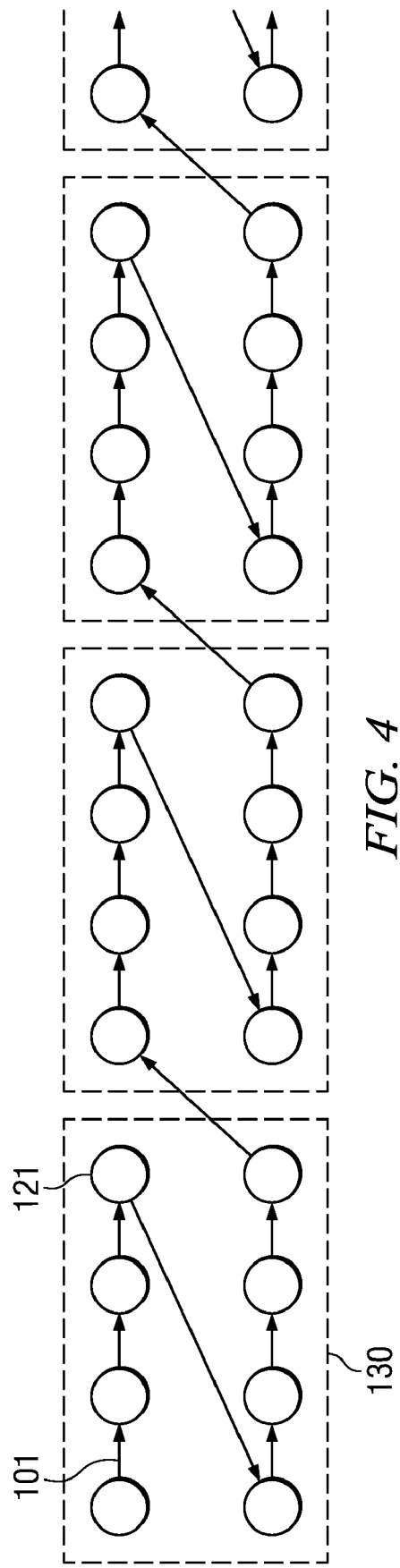
FIG. 4 is a diagram explaining the movement path of the light emission data.

In the following, the drive timing of black line B shown in FIG. 3 will be explained. Black line B of one row moves sequentially to the next row and then returns to the same row in a certain period of time. The period of time until the black line returns to the same row is preferred to be 1/60 (sec) or less. If the time period is longer than that, it will be perceived as flickering by human eyes. The time period until black line B returns to the same row can also be synchronized with one field or one frame of the display device. In this case, the movement period of the black line can also be synchronized with the vertical synchronization signal.

Said black line B is not limited to one row. It can also occupy plural adjacent rows. If black line B occupies multiple rows, it is possible to move black line B multiple row increments, or to move the black line one row at a time. It is also possible to form black lines in several rows separated from each other out of the multiple rows, and to move the black lines sequentially.

Switching control of switches 51, 52, 53, 54 of switching circuit 18 will be explained in the following. Switching circuit 18 has a register used for storing the switching control data. Before light emission data are input, the switching control data are input from data input terminal 36 into said register, and each switch is controlled appropriately based on the switching control data. In this case, since data input terminal 36 is shared, there is no need to add external terminals. This is an advantage. It is also possible to adopt a special switching control terminal and input the switching control data from said terminal to set each switch appropriately.

For the LED driving element of the present invention, drive control of a backlight in which a certain row of the backlight is formed as a black line and said black line is moved periodically has been explained as an example. The LED driving element of the present invention can also be applied to an image quality improvement method known as "adaptive dimming" that brightens and darkens the backlight in part. In this case, the desired area of the backlight to be formed as a dark part can be controlled according to the display image.

While the invention has been shown and described with reference to preferred embodiments thereof, it is well understood by those skilled in the art that various changes and modifications can be made in the invention without departing from the spirit and scope of the invention as defined by the appended claims.

The invention claimed is:

1. An LED driving device comprising:
   plural first and second LED driving terminals connectable to respective light-emitting elements comprising LED elements;
   first and second LED driving circuits connected to said first and second LED driving terminals, respectively, for energizing said light-emitting elements when connected to said first and second LED driving terminals to emit light according to stored content;
   a data input terminal into which light emission data indicating the light emission status of said light-emitting device are input sequentially;
   a data output terminal that outputs the light emission data output from said first or second shift register to the outside; and
   first and second shift registers that store said light emission data in the input order, store the same number of light emission data as there are the first and second LED driving terminals, respectively, and output the overflow light emission data whereby when a transmission signal is input, said light emission data stored in said first and second shift registers are transmitted into said first and second LED driving circuits and are stored in said first and second LED driving circuits, respectively;

wherein the LED driving element has a switching circuit that switches between a normal mode in which said data input terminal, said first shift register, said second shift register, and said data output terminal are connected in series, said light emission data input to said data input terminal are transmitted to said first shift register and said second shift register in that order and are output from said data output terminal, and an image quality improvement mode in which a selected one of said first or second shift register is connected between said data input terminal and said data output terminal, said light emission data input to said data input terminal are transmitted into the shift register connected to said data input terminal and said data output terminal and are output from said data output terminal, wherein data stored in a non-selected one of said first or second shift registers is retained and data input to said selected one of said first or second shift registers is replaced with data to form a darkened line on the LEDs connectable to the device, wherein the data to generate the darkened line is generated outside the display and the time to rewrite the data is reduced to m*n*t, where:

m=the number of LED driving elements connected in series, n=the number of driving terminals in each first and second column, and t=the duration of the pulse.

2. A LED driving device of claim 1 wherein the plural LED driving elements are connected in parallel with each other between plural said light-emitting elements; the data output terminal of one of adjacent LED driving elements is connected to the data input terminal of the other element; said light emission data input to the data input terminal of the former LED driving element are transmitted to the latter LED driving element.

3. An LED driving element comprising:

a rectangular LED driving element used for driving LED elements;

a first driving terminal group arranged along the first edge, a second driving terminal group positioned along the second edge on the side opposite from said first edge, a first driving circuit connected to said first driving terminal group, a second driving circuit connected to said second driving terminal group, a first register that supplies plural driving data in parallel to said first driving circuit, a second register that supplies plural driving data in parallel to said second driving circuit, a data input terminal to which the plural driving data supplied are input in series, a data output terminal that outputs the plural driving data in series, and a switching circuit connected to said data input terminal, said first register, said second register, and said data output terminal wherein said switching circuit includes:

a first switch circuit for connecting said data input terminal to the serial input terminal of said first register or a first data line, a second switch circuit for connecting the serial output terminal of said first register to a second data line or a third data line, a third switch circuit for connecting the serial input terminal of said second register to said second data line or first data line, and a fourth switch circuit for connecting said data output terminal to the serial output terminal of said second register or said third data line, whereby according to the connection states of said first and second, third, and fourth switch circuits, the driving data supplied to said data input terminal are transmitted serially on a first path including said data input terminal, said first register, said second register, and said data output terminal, a second path including said data input terminal, said first register, and said data output terminal, or a third path including said data input terminal, said second register, and said data output terminal, wherein said switching circuit couples data to one of the first and second registers to form a darkened line on the LEDs connectable to the device and bypasses the other of said first and second registers so that it retains data stored therein, wherein the data to generate the darkened line is generated outside the display and the time to rewrite the data is reduced by substantially 50 percent.

4. A driving method for a backlight device having plural light-emitting elements arranged in a matrix form, a driving circuit used for driving the light-emitting elements of two adjacent rows, and a driving data supply circuit that supplies to said driving circuit the driving data used for driving the light-emitting elements in series, comprising:

driving the light-emitting elements in one of said two adjacent rows with a first driving part, driving the light-emitting elements in another row of said two adjacent rows with a second driving part, supplying said driving data to said first driving part, with a first shift register, supplying said driving data to said second driving part, with a second shift register, supplying data to a data input terminal and outputting said driving data at a data output terminal and switching the connections between said data input terminal, said first shift register, said second shift register, and said data output terminal with a switching circuit;

when updating the driving data for said first and second driving parts connecting said first and second shift registers in series between said data input terminal and said data output terminal with said switching circuit to supply the driving data sequentially to said first and second shift registers corresponding to a clock signal;

when updating the driving data for said first or second driving part alone connecting said first or second shift register between said data input terminal and said data output terminal with said switching circuit to supply the driving data sequentially to said first or second shift register corresponding to a clock signal, wherein said switching circuit couples data to one of the first and second shift registers to form a darkened line on LEDs connectable to the device and bypasses the other of said first and second shift registers so that it retains data stored therein, wherein the data to generate the darkened line is generated outside the display and the time to rewrite the data is reduced to m*n*t, where:

m=the number of LED driving elements connected in series, n=the number of driving terminals in each first and second column, and t=the duration of the pulse.

* * * * *